US010296993B2

(12) United States Patent
Jacobs et al.

(10) Patent No.: US 10,296,993 B2
(45) Date of Patent: May 21, 2019

(54) METHOD AND APPARATUS FOR DEFINING PERFORMANCE MILESTONE TRACK FOR PLANNED PROCESS

(71) Applicant: Conduent Business Services, LLC, Dallas, TX (US)

(72) Inventors: Timothy W. Jacobs, Fairport, NY (US); Robert John Rolleston, Rochester, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 1103 days.

(21) Appl. No.: 14/537,449

(22) Filed: Nov. 10, 2014

(65) Prior Publication Data

US 2016/0133145 A1  May 12, 2016

(51) Int. Cl.
*G06Q 50/20* (2012.01)
*G06Q 10/06* (2012.01)

(52) U.S. Cl.
CPC ....... *G06Q 50/20* (2013.01); *G06Q 10/06398* (2013.01)

(58) Field of Classification Search
CPC .... G06Q 10/10; G06Q 10/06; G06Q 10/0638; G06Q 50/20; G09B 5/14; G09B 7/00; G09B 7/02; G09B 7/08; G06F 17/30289; G06N 5/04
USPC ................. 434/322, 323, 350, 362
See application file for complete search history.

(56) References Cited

U.S. PATENT DOCUMENTS

| | | | |
|---|---|---|---|
| 6,120,300 A * | 9/2000 | Ho | G09B 5/14 434/118 |
| 6,292,830 B1 | 9/2001 | Taylor et al. | |
| 7,311,524 B2 | 12/2007 | Jennen et al. | |
| 8,468,244 B2 | 6/2013 | Redlich et al. | |
| 8,628,331 B1 * | 1/2014 | Wright | G09B 19/00 434/107 |
| 8,744,937 B2 | 6/2014 | Seubert et al. | |

(Continued)

OTHER PUBLICATIONS

Aimsweb Data Management and Reporting, printed from http://www.aimsweb.com/assessments/features/data-management-and-reporting on Oct. 15, 2014, Copyright 2014, 2 pp.

(Continued)

*Primary Examiner* — Jerry-Daryl Fletcher
(74) *Attorney, Agent, or Firm* — Fay Sharpe LLP

(57) ABSTRACT

A method of defining a performance milestone track for a planned process includes: selecting a time range relating to a repeatable process to define a set of average assessment trajectories, retrieving historical data representative of assessment data for actors in conjunction with selective assessments of the actors during performances of the repeatable process. The historical data includes an assessment parameter identifying a value for the selective assessment. The method includes processing a select time portion of the historical data using a binning algorithm to assign historical data for the select time portion across quantile range bins based on select ranges of assessment parameter values for the historical data and separately processing a select actor portion of the historical data for each quantile range bin using a smoothing algorithm to form the set of average assessment trajectories for the repeatable process. A computational device for performing the method is also provided.

20 Claims, 12 Drawing Sheets

(56) References Cited

U.S. PATENT DOCUMENTS

| | | |
|---|---|---|
| 2007/0276723 A1 | 11/2007 | Samid |
| 2010/0070455 A1 | 3/2010 | Halperin et al. |
| 2014/0058763 A1 | 2/2014 | Zizzamia et al. |
| 2014/0222522 A1 | 8/2014 | Chait |

OTHER PUBLICATIONS

Aimsweb Sample Reports, printed from http://www.aimsweb.com/assessments/features/data-management-and-reporting on Oct. 15, 2014, Copyright 2014, 2 pp.

Aimsweb the most comprehensive assessment system for grades K-12; Copyright 2013, Pearson Education, Inc., 7 pp.

Linking the R-CBM and MAZE with the Lexile Framework for Reading, Sep. 14, 2011, MetaMetrics, Inc., 59 pp.

\* cited by examiner

METHOD AND APPARATUS FOR DEFINING PERFORMANCE MILESTONE TRACK FOR PLANNED PROCESS

BACKGROUND

This disclosure presents various embodiments of a method of defining a performance milestone track for a planned process. In several embodiments, the method is applied to define a performance milestone track for a student in a specific grade level at a specific educational institution based on historical data regarding prior assessments of students in the same grade level at the same educational institution. However, the method can also be applied to any repeatable process with measurable performance milestones in a variety of fields. For example, the method can be applied to skills training and corresponding task performance for military operations, emergency operations, healthcare, traffic control operations, power plant operations, vehicle operations, manufacturing tasks, construction tasks, and office tasks. Various embodiments of a computational device for performing the method are also provided. The disclosure also presents various embodiments of a computer-readable medium storing program instructions that, when executed, cause a computational device to perform the method.

Student learning, for example, is often chaotic—starting at different points in time with different abilities, progressing in leaps and bounds, or sometimes even regressing over short periods of time. Given this state, it is often difficult for teachers to set appropriate end goals, intermediate milestones, and to understand where the student is with respect to progress against a personalized learning goal. Often it is desirable to set short term milestones that will enable progress to be measured and provide feedback that enables the teacher to more confidently assess whether the goal will be reached or not.

BRIEF DESCRIPTION

In one aspect, a method of defining a performance milestone track for a planned process is provided. In one embodiment, the method includes: selecting a desired time range in relation to a duration for a repeatable process in conjunction with using a computational device to define a set of average assessment trajectories for the repeatable process; retrieving historical data from a storage device accessible to the computational device, wherein the historical data is representative of assessment data for a plurality of actors in conjunction with selective assessments of the plurality of actors during performances of the repeatable process, wherein the historical data includes an assessment parameter identifying a value for the corresponding selective assessment; processing a select time portion of the retrieved historical data at the computational device using a binning algorithm, wherein the binning algorithm assigns historical data for the select time portion across a plurality of quantile range bins based on select ranges of assessment parameter values for the corresponding historical data; and separately processing a select actor portion of the retrieved historical data for each quantile range bin at the computational device using a smoothing algorithm to form the set of average assessment trajectories for the repeatable process.

In another aspect, a computational device for defining a performance milestone track for a planned process is provided. In one embodiment, the computational device includes: at least one data processor configured to execute program instructions; and a non-transitory storage device configured to store program instructions that, when executed by the at least one processor, cause the computational device to perform a method of defining a performance milestone track for a planned process. In conjunction with execution of the program instructions, the at least one data processor is configured to select a desired time range in relation to a duration for a repeatable process to define a set of average assessment trajectories for the repeatable process. In conjunction with execution of the program instructions, the at least one data processor is configured to retrieve historical data from a data storage device accessible to the computational device, wherein the historical data is representative of assessment data for a plurality of actors in conjunction with selective assessments of the plurality of actors during performances of the repeatable process, wherein the historical data includes an assessment parameter identifying a value for the corresponding selective assessment. In conjunction with execution of the program instructions, the at least one data processor is configured to process a select time portion of the retrieved historical data using a binning algorithm, wherein the binning algorithm assigns historical data for the select time portion across a plurality of quantile range bins based on select ranges of assessment parameter values for the corresponding historical data. In conjunction with execution of the program instructions, the at least one data processor is configured to separately process a select actor portion of the retrieved historical data for each quantile range bin using a smoothing algorithm to form the set of average assessment trajectories for the repeatable process.

In yet another aspect, a non-transitory computer-readable medium storing program instructions is provided. The program instructions, when executed by at least one processor, cause a corresponding computational device to perform a method of defining a performance milestone track for a planned process. In one embodiment, the method includes: selecting a desired time range in relation to a duration for a repeatable process in conjunction with using a computational device to define a set of average assessment trajectories for the repeatable process; retrieving historical data from a storage device accessible to the computational device, wherein the historical data is representative of assessment data for a plurality of actors in conjunction with selective assessments of the plurality of actors during performances of the repeatable process, wherein the historical data includes an assessment parameter identifying a value for the corresponding selective assessment; processing a select time portion of the retrieved historical data at the computational device using a binning algorithm, wherein the binning algorithm assigns historical data for the select time portion across a plurality of quantile range bins based on select ranges of assessment parameter values for the corresponding historical data; and separately processing a select actor portion of the retrieved historical data for each quantile range bin at the computational device using a smoothing algorithm to form the set of average assessment trajectories for the repeatable process.

DETAILED DESCRIPTION

Figure 1:
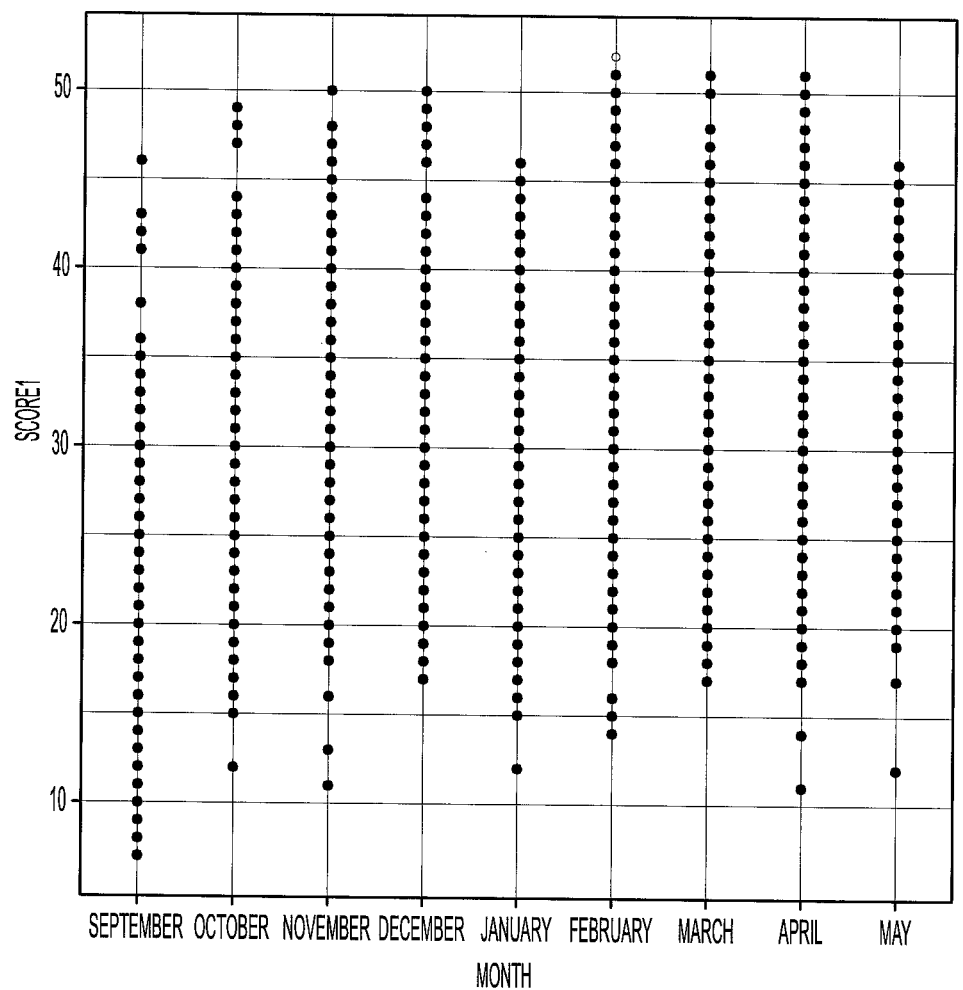
FIGS. 1 and 12 provide graphs of historical data with score and month axes. In the left view, data points for each month are linearly overlaid along the month axis. In the right view, data points for each month are jittered along the month axis.

The disclosure describes various embodiments of a system and method that, for example, enables teachers to establish a set of milestones for a student's progress towards a learning goal. It incorporates both an algorithmic element and a visual element. The method uses historical data to establish a set of milestones. A profile of the current student's performance on the topic is calculated based on the student's assessment data and used to subset the historical data which is then used to establish intermediate milestones along the way to the goal. The visualization presented to the user indicates the beginning state of the student and the calculated milestones likely necessary to achieve the end goal.

In summary, the method is suited to: 1) use historical data to calculate an appropriate set of milestones likely to meet a goal and 2) show the progress a student is making against this set of defined milestones to indicate if the student is at risk of not meeting the end goal. One aspect of this method is the use of historical data to calculate an appropriate set of milestones which will result in successful completion of the goal for a select student.

Although one set of exemplary sample data is used throughout the disclosure, it should be understood that the method is equally suited to any data set in which student outcomes are measured for a topic and for which there is a suitable history of outcome measurements for that topic. The historical data set should possess a number of intermediate measures for a number of students and the success or failure criteria for a student in meeting a desired goal. It is useful to understand some of the characteristics typical of such data sets.

The data used in this example is AIMsweb data from a select school district. More specifically, it is MAZE General Outcome Measurement (GOM) data for Grade 5 of the select school district. Maze is a multiple-choice cloze task that students complete while reading silently. For example, the first sentence of a 150-400 word passage is left intact. Thereafter, every seventh word may be replaced with three words inside parenthesis. One of the words is from the original passage. The other two words provide selections that are less suited than the word from the original passage. For each student in this data set, an assessment was given each month throughout the school year. The scores were stored in a field called "Score1." The goal is to achieve at or above a certain cut-off score by the end of the school year, e.g., the final assessment score in May.

To show the structure of the data, e.g. the monthly score on a particular topic, for a given student; A small portion of the data for a single student is shown in Table 1. Table 1 provides a small portion of the Grade 5 MAZE data used as an example in this document.

TABLE 1

| StudentID | GOM | Month | Score1 |
|---|---|---|---|
| 100279 | MAZE | September | 27 |
| 100279 | MAZE | October | 42 |
| 100279 | MAZE | November | 40 |
| 100279 | MAZE | December | 43 |
| 100279 | MAZE | January | 33 |
| 100279 | MAZE | February | 36 |
| 100279 | MAZE | March | 40 |
| 100279 | MAZE | April | 48 |
| 100279 | MAZE | May | 38 |

A typical data set will contain such records for hundreds or thousands of students. The method disclosed herein solves the problem of how to determine which of these historical records are applicable to defining a set of milestones for a current student. To better understand the problem and the solution, a further investigation and characterization of the data is useful.

Figure 2:
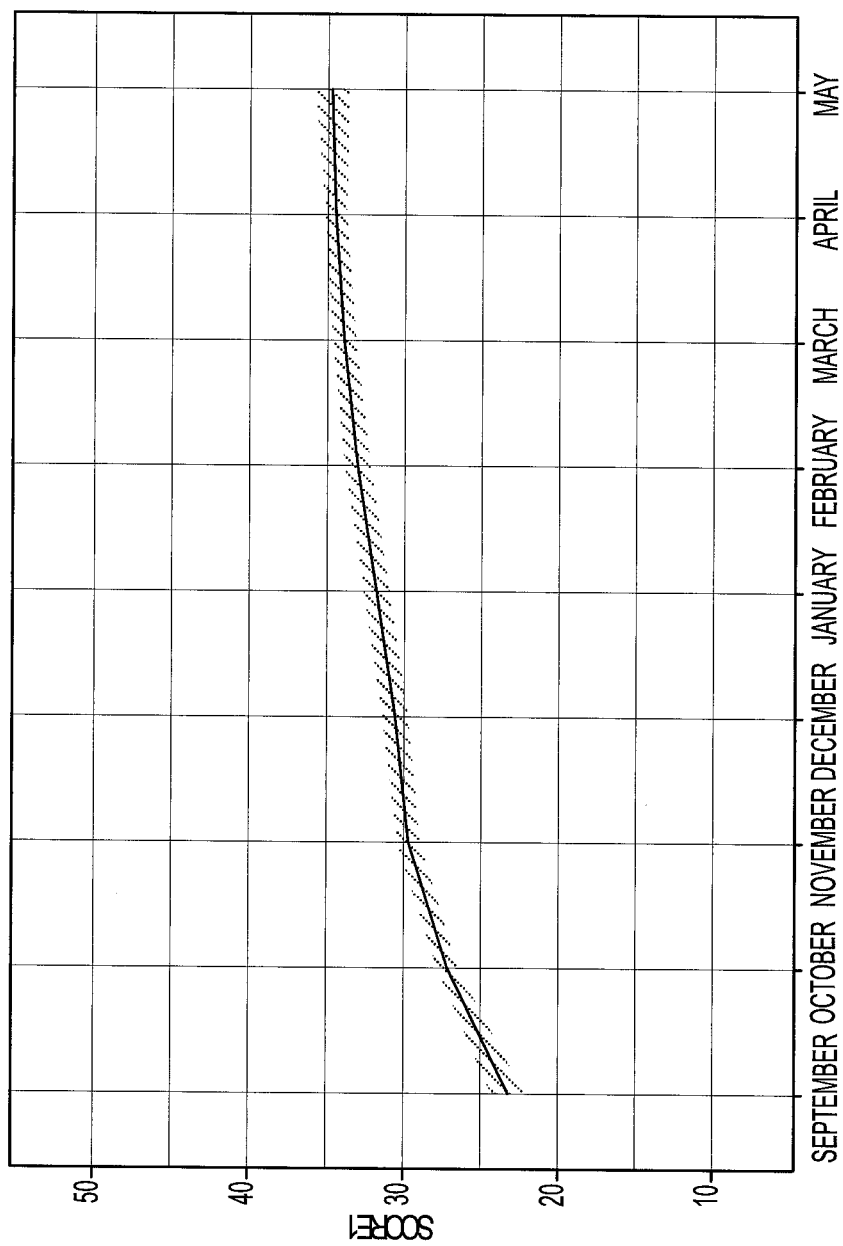
FIGS. 2 and 13 provide graphs reflecting statistical analyses of the historical data of FIG. 1. In the left view, the data points are summarized by a smoothed line representing the mean with an error estimate. In the right view, the data points are summarized in a box plot that includes dispersion information.
Figure 12:
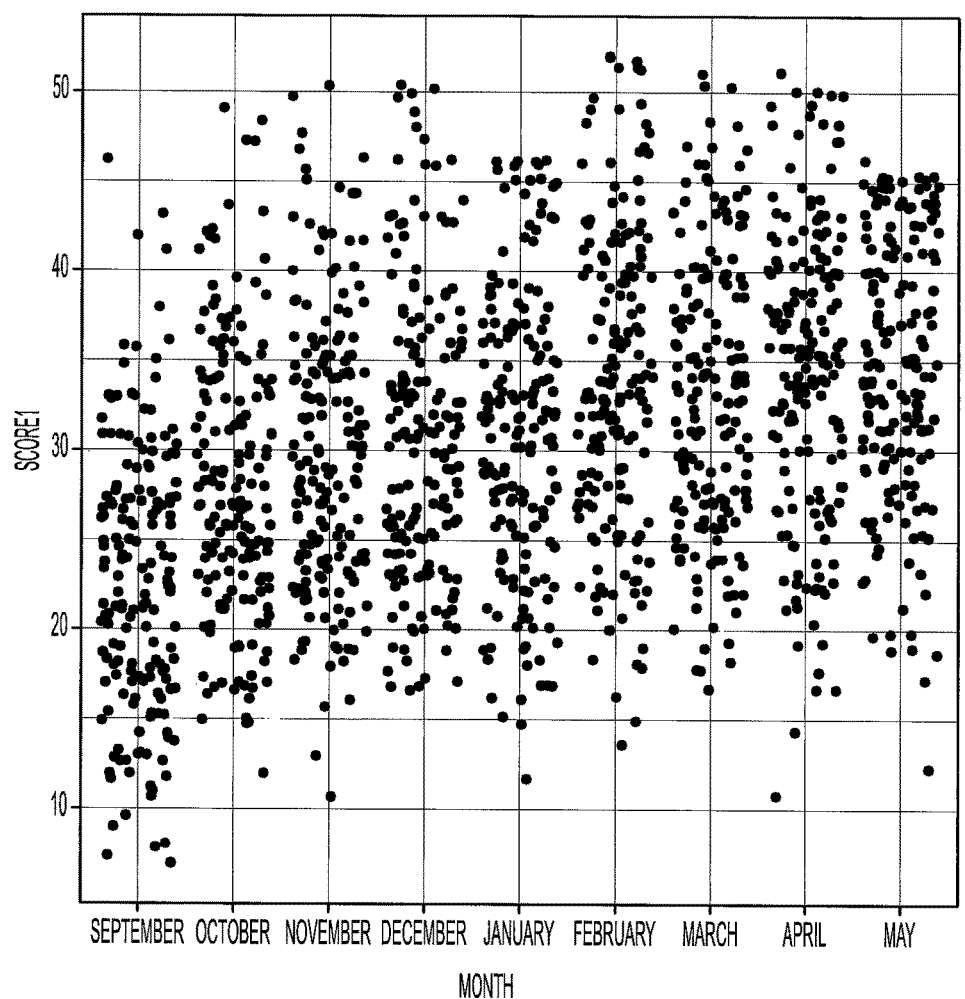
Figure 13:
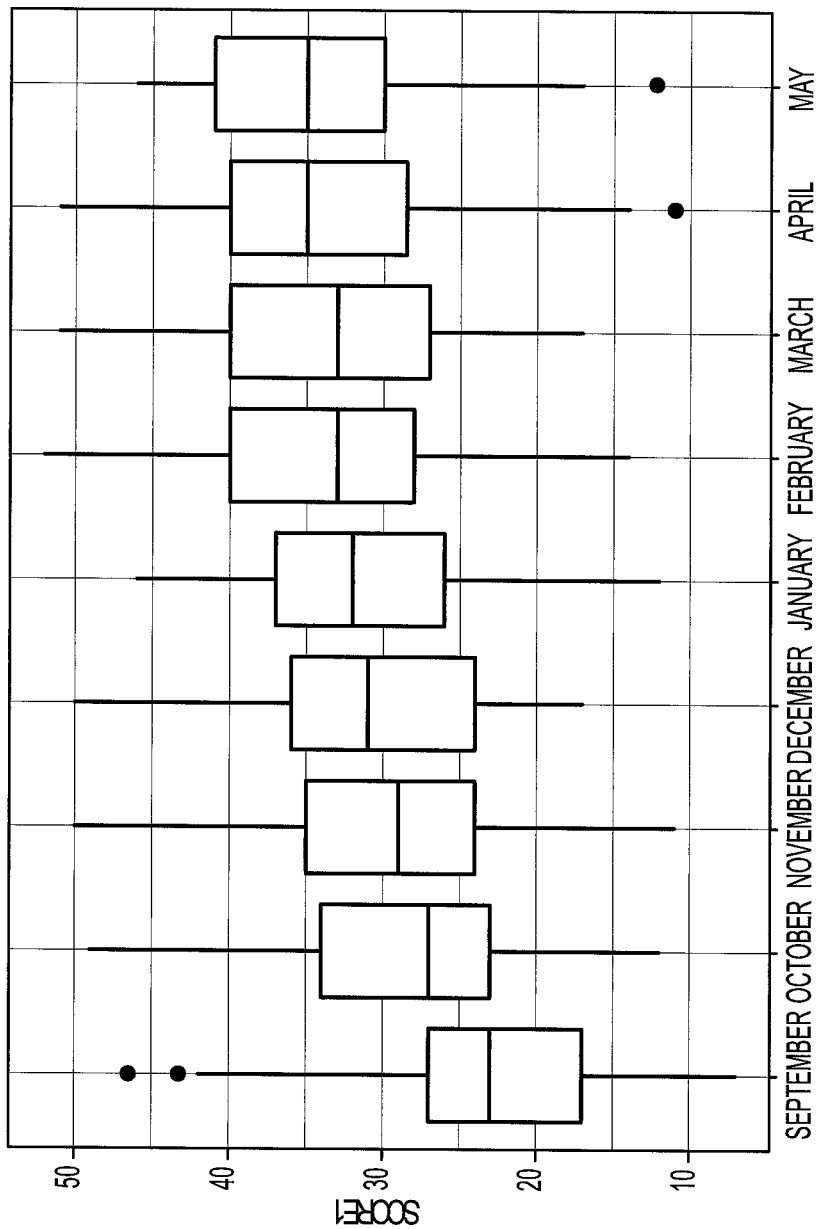

FIGS. 1 and 12 show the Score1 data values for the exemplary data set. The graph on the left shows a simple point plot of this data. Note that in using this representation there can be many points stacked on top of another and there is no sense for how many such points there may be. The graph on the right "jitters" the points to alleviate this overprint problem. This helps to show the general spread of the data at each month and the general upward trend, but offers little in providing guidance in setting any intermediate milestones for a specific student or unique milestones for each student in a class. A statistical summary of the data results in a much cleaner representation, as shown in FIGS. 2 and 13. FIG. 2 shows a smoothed line through the mean MAZE score for each month and an error estimate around the mean. This representation clearly shows the increase in Score1 over time, however this figure loses the sense of variability inherent in the raw data. FIG. 13 shows a box plot of this data. Here the viewer can better see the dispersion of MAZE scores for each month, and still perceive the general upward trend.

There are at least two issues with all of these representations. First, there is no sense of individual student trajectories. Additionally, the plots are for the entire historical student population and do not provide a sense of the applicability of the current student to the population mean. These are statistical summaries of the entire sample, where there is a large variance in the spread of the data. The question remains: Where in this spread is the current student likely positioned?

Figure 3:
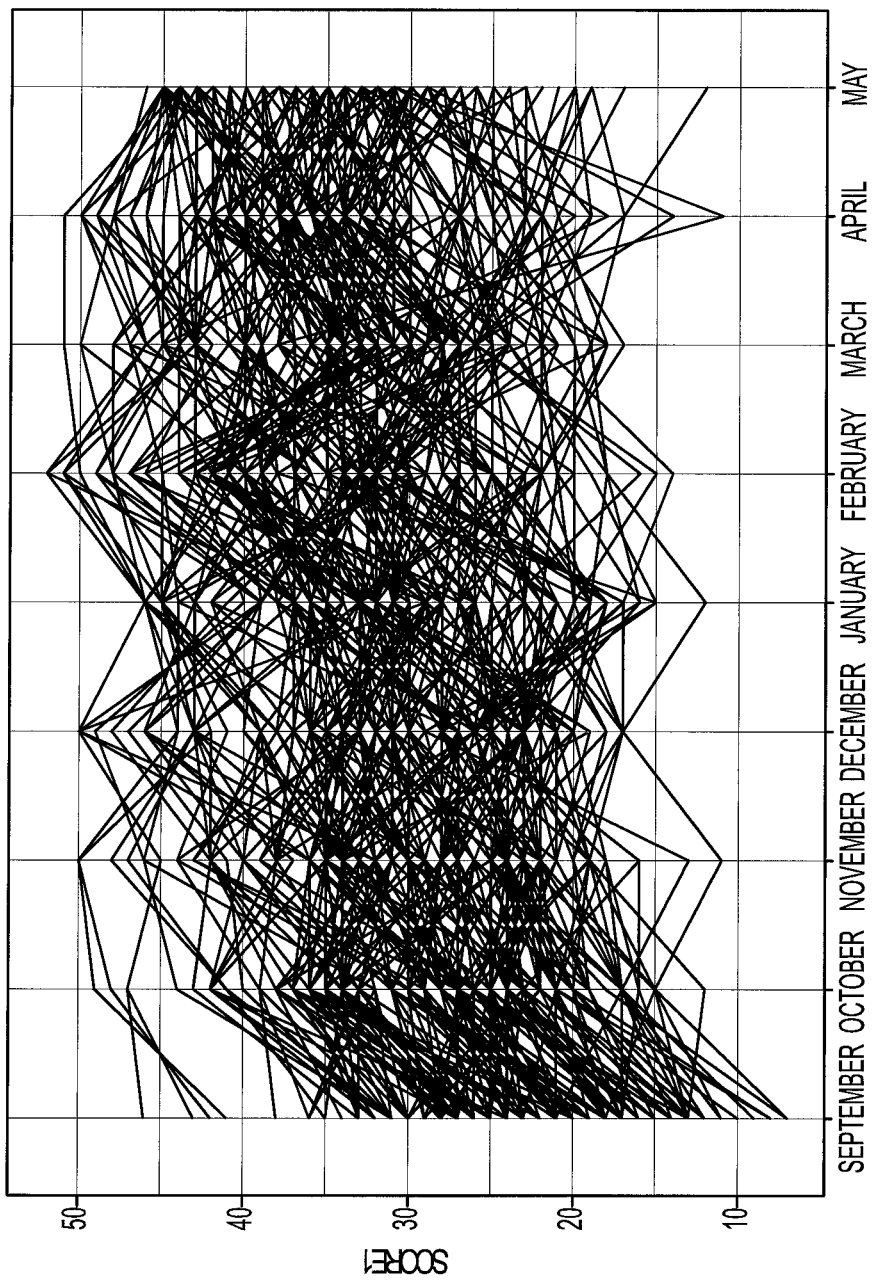
FIG. 3 provides a graph of the historical data of FIG. 1 plotted with trajectories lines connecting data points for each student.

A representation of the trajectory nature of this data is shown in FIG. 3 which shows the historical data as trajectory lines—line for each student who has taken a Grade 5 MAZE assessment. The graph shows that the GOM score trajectories can be somewhat chaotic. The graph shows data for all students in the history database.

Figure 4:
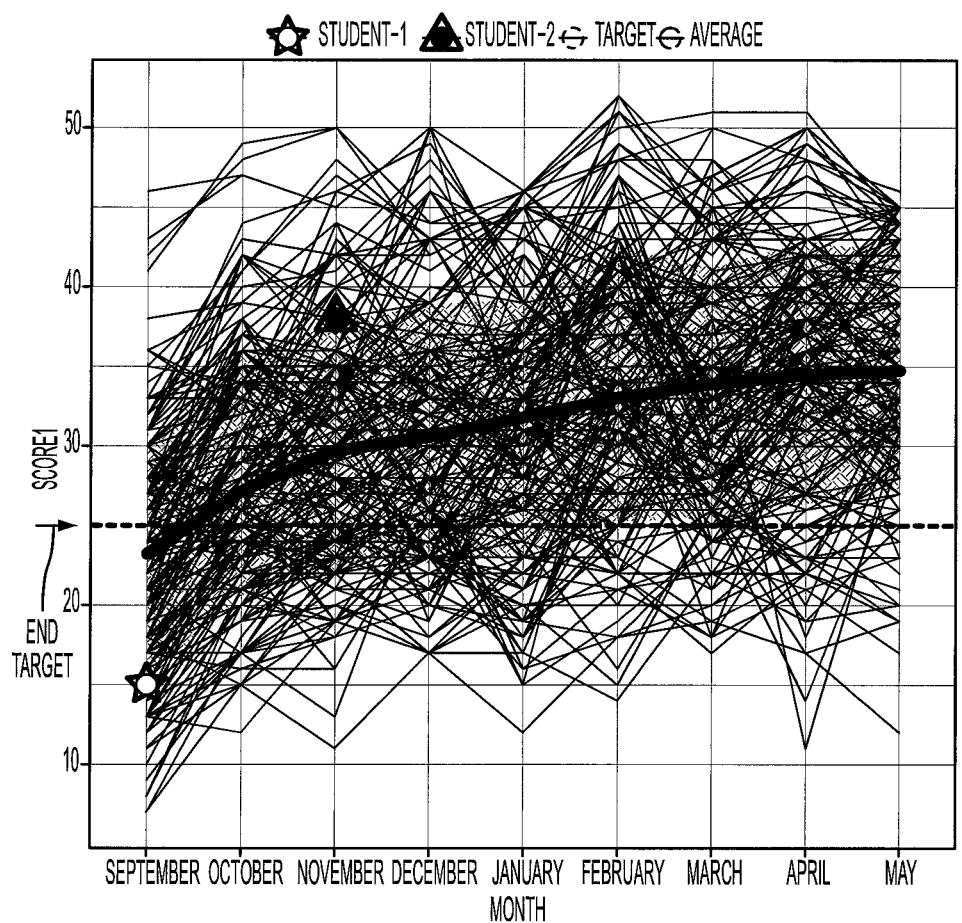
FIG. 4 provides a graph reflecting statistical analysis of the historical data of FIG. 1, the trajectory lines of FIG. 3, a goal line, and two current student scores.

With reference to FIG. 4, three elements are added to the graph of FIG. 3: 1) a smoothed average track of all historical students (see the black line), 2) a standard deviation of average track (see the shaded area), and 3) a goal line (see the dashed line). The dashed line and the associated wide shaded band are the month by month mean of all the historical data and one standard deviation about the mean. The dashed horizontal line indicates the yearend target goal score. Also shown are the initial known scores (one in September and the other in November.) for two current students, neither of which is very close to the population average.

This introduces some of the elements needed to satisfy the desired features enumerated above. However, this is hardly satisfactory in that it does not use the historical data in a way that is tailored to the new student(s). This issue is mainly due to the large variance of the data at any given month. For the example given in FIG. 4, the two current students are at very different positions, and will likely follow different trajectories throughout the year. Student-1 (star) is well below the expected level, and their plan may be to simply get to the goal. Student-2 (triangle) is already above the end goal, but they should not be expected to learn nothing, but rather to exceed the target goal. Using a single historical average for these two students does them each a disservice; Given the wealth of historical data, what can we realistically expect each student to accomplish?

The method disclosed herein provides a mechanism to create more personalized intermediate milestone tracks for a current student. One aspect of the method is the application of a binning algorithm applied to each of the historical records at each point in time. This binned data is used to establish a set of milestone tracks. A new student is matched to a milestone track that best fits the initial knowledge of that student's level. In one embodiment, the binning algorithm uses quantiles to establish the bins. There are many ways to bin, or quantize data, but the use of quantile ranges is a concept familiar to the educational community.

Figure 5:
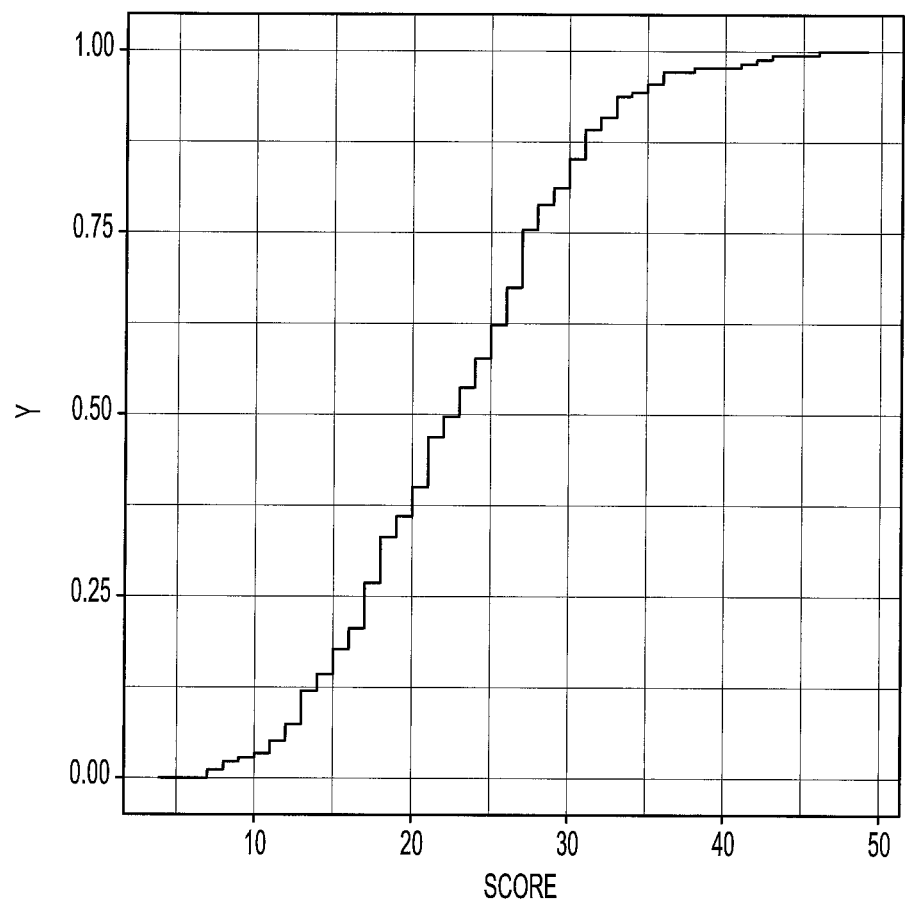
FIG. 5 provides a graph of a cumulative distribution function for scores during the first month from the historical data of FIG. 1.

For example, the empirical cumulative distribution function (ECDF) can be used to determine bins. In the example data, an assessment is given each month of the school year (i.e., nine total assessments). Quantiles are established for each month's scores using the history of data available. Therefore, there would be nine sets of quantiles for this data. In the example given in this document we use quartiles as the quantile unit. This results in four bins for each month—thirty six bins in total. It is possible to use any number of quantile bins. The historical data establishes the thresholds for each bin at each month. To determine which bin a new student's scores fall in, we apply the appropriate thresholds as determined by which month the initial assessments were taken. An example ECDF used for this purpose is shown in FIG. 5. The example ECDF in FIG. 5 is derived from the Grade 5 MAZE September assessment data. This function would be used to determine the September quantile data. A different function, based on October historical data, would be used to determine the October quantile data. It is also possible to define the milestone tracks using overlapping bins or some other binning strategy.

Figure 6:
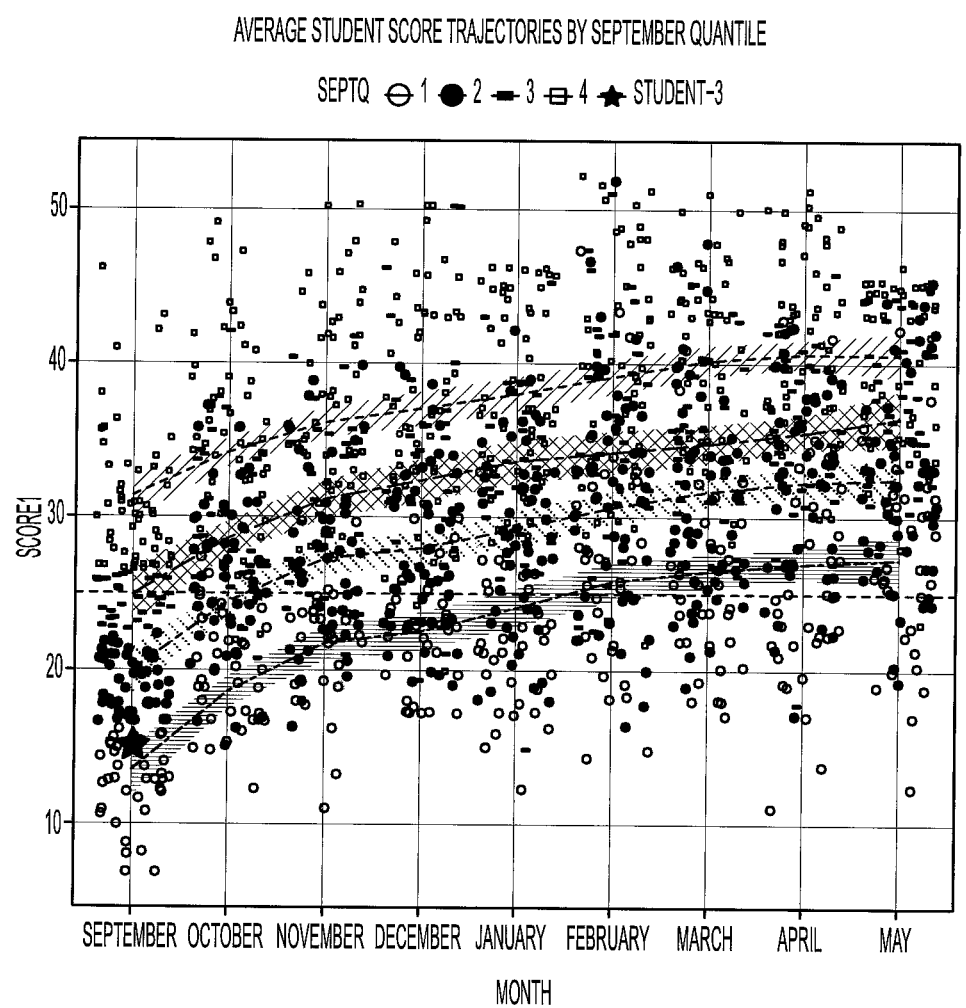
FIG. 6 provides a graph of average student score trajectories for the historical data of FIG. 1 and a current student score for the first month in which the average scores are grouped using quartile binning of scores during the first month.

If this ECDF is used to define quantile bins, based upon the historical data for September, it is possible to assign each track to a quantile bin, and to average only the tracks which share the same quantile. The result of such an algorithm is shown in FIG. 6 where the trajectories of average scores are shown. Each of the four curves represent a set of students selected by how well they scored on the September assessment (i.e. which quartile their scores fell in). Notice that we now have four very distinct tracks. This is a useful result given the chaotic nature of the historical data and the chaotic nature shown in the score trajectory for certain students. This is true for other data sets we have also investigated. Each new student, with a score in September, can now be associated with a more personalized learning track.

An example set of data for a new student in September is shown in Table 2. The Score1 data is entered by the teacher but the quantile data is determined by the tool using the algorithm described above.

TABLE 2

| StudentID | Month | GOM | Score1 | quantile |
|---|---|---|---|---|
| 3 | September | MAZE | 12.00 | 1.00 |

In this example set, the student score profile would be (September=1). This student's score in September is plotted in FIG. 6 (see star). In this case, the student should be assigned the quartile-1 learning trajectory (the lowest track).

An example set of data for a new student in November is shown in Table 3. The Score1 data is entered by the teacher but the quantile data is determined by the tool using the algorithm described above. In this example set, the student score profile would be (November=4).

TABLE 3

| StudentID | Month | GOM | Score1 | quantile |
|---|---|---|---|---|
| 4 | November | MAZE | 38.00 | 4.00 |

Figure 7:
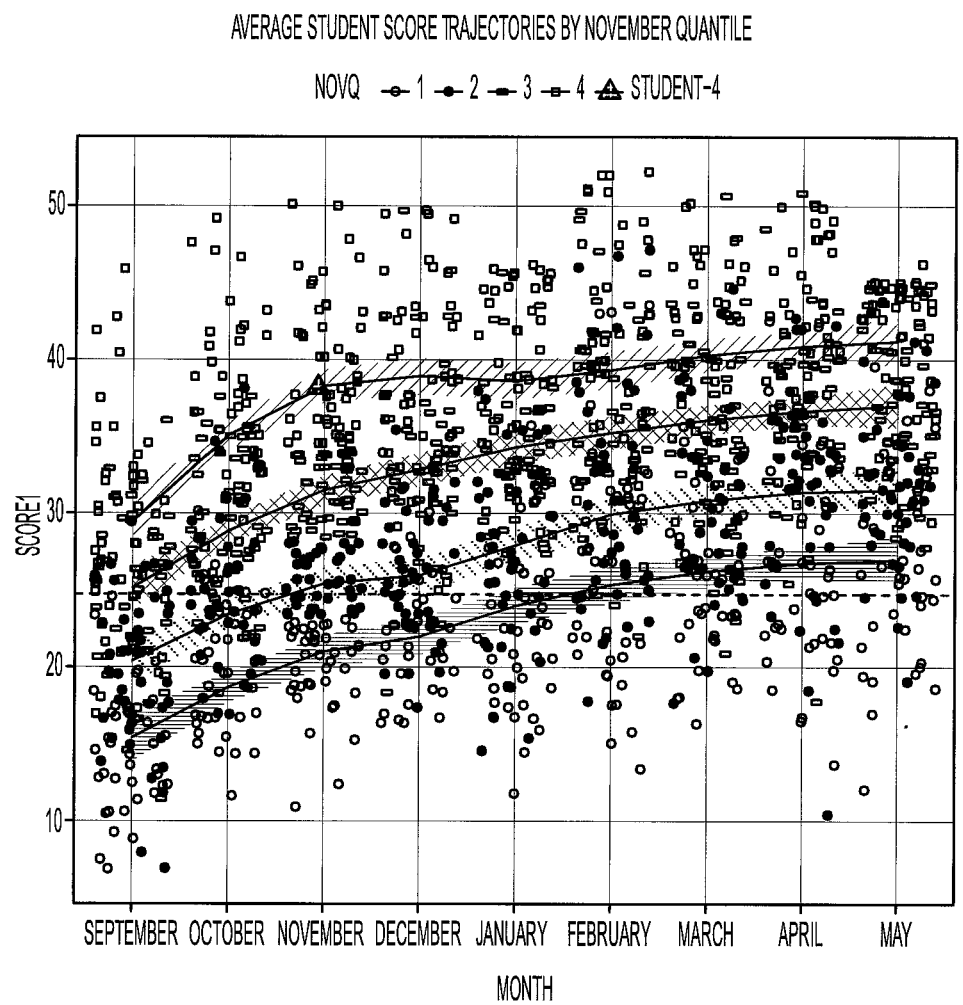
FIG. 7 provides a graph of average student score trajectories for the historical data of FIG. 1 and a current student score for the third month in which the average scores are grouped using quartile binning of scores during the third month.

This student's score in November is plotted in FIG. 7 (see triangle). In this case, the student should be assigned the highest quartile learning trajectory (shown in blue). Notice also that the quantile curves are different than those shown in FIG. 6. This plot is using the November scores to establish each quantile set. This ability to use the quantile score for any month is another aspect of the method disclosed herein.

Student scores for assessments can vary considerably over time, even while the topic being assessed is held constant. This makes tracking progress and setting intermediate goals on the road to achieving a milestone particularly challenging—even for experienced teachers. We have described a system and method that isolates relevant historical data and presents a visualization that makes this task simpler and more confident. The data used to construct the visual tool is particularly relevant for the student whose data is being evaluated because it comes from historical data gathered by the school or school district in which the student is enrolled.

The tool allows setting appropriate goals for any student, regardless of when performance is measured and finds a milestone track appropriate to the student's available initial ability. In summary form, the method includes: i) Within each time period of the historical data, a) calculating quartile (or another appropriate binning) ranges, and b) calculating average track within each quartile and ii) for a new student in month M, a) using the quartile break points for month M, b) determining the student's quartile position Q, and c) using the average track defined for quartile Q in month M.

Figure 8:
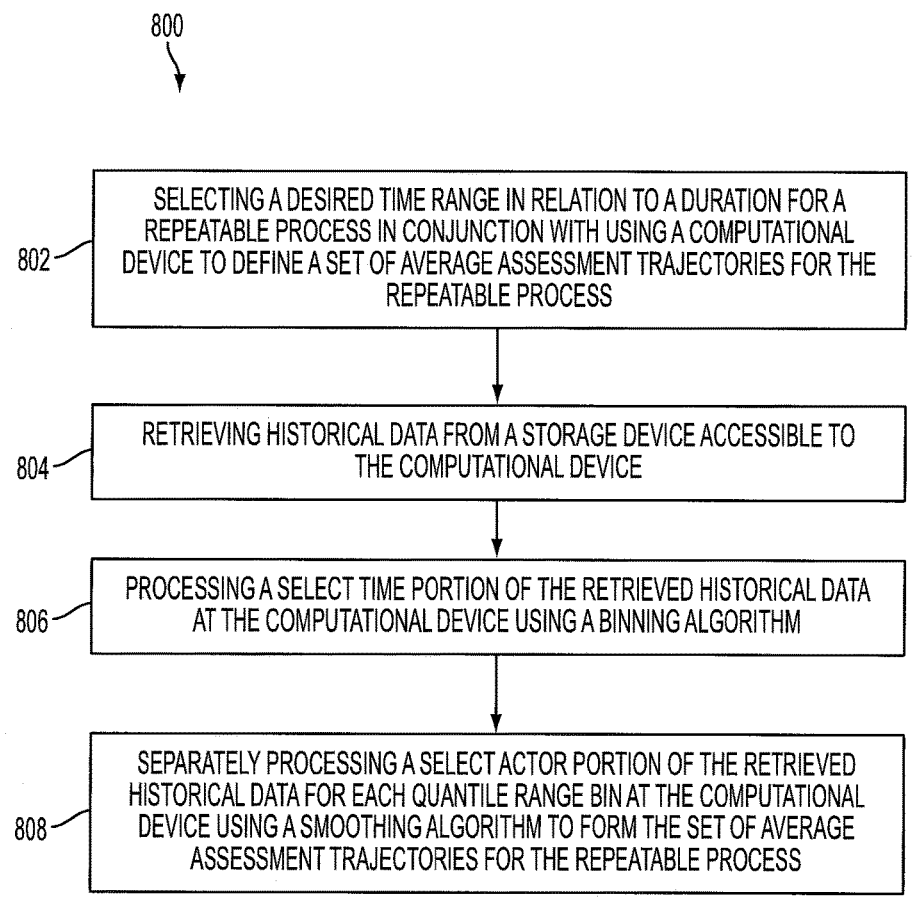
FIG. 8 is a flowchart of an exemplary embodiment of a process for defining a performance milestone track for a planned process.

With reference to FIG. 8, an exemplary embodiment of a process 800 for defining a performance milestone track for a planned process begins at 802 where a desired time range is selected in relation to a duration for a repeatable process in conjunction with using a computational device to define a set of average assessment trajectories for the repeatable process. Next, historical data is retrieved from a storage device accessible to the computational device (804). The historical data is representative of assessment data for a plurality of actors in conjunction with selective assessments of the plurality of actors during performances of the repeatable process. The historical data includes an assessment parameter identifying a value for the corresponding selective assessment. At 806, a select time portion of the retrieved historical data is processed at the computational device using a binning algorithm. The binning algorithm assigns historical data for the select time portion across a plurality of quantile range bins based on select ranges of assessment parameter values for the corresponding historical data. Next, a select actor portion of the retrieved historical data for each quantile range bin is separately processed at the computational device using a smoothing algorithm to form the set of average assessment trajectories for the repeatable process.

In another embodiment of the process 800, the set of average assessment trajectories are representative of average assessment parameter values over time in relation to the duration of the repeatable process. In this embodiment, the process 800 also includes formatting the set of average assessment trajectories in at least one of a graph format and a table format. Next, the formatted set of average assessment trajectories is sent to at least one of a display device, a printing device, and a storage device.

In yet another embodiment of the process 800, the repeatable process is a specific grade level at a specific educational institution. In this embodiment, the plurality of actors are a plurality of students having completed the specific grade level at the specific education institution during one or more academic years. In the embodiment being described, the duration is defined by first and last days of an academic year.

In a further embodiment of the process 800, the specific educational institution is a public school district. In an even further embodiment of the process 800, the specific educational institution is a specific school in the school district.

In another further embodiment of the process 800, the specific educational institution is a private school. In yet another further embodiment of the process 800, the specific educational institution is one of an early childhood school, a primary school, a secondary school, and a post-secondary school.

In still another embodiment of the process 800, the duration is defined by a first time range, at least one intermediate time range, and a last time range, wherein the desired time range is representative of the first time range, one of the at least one intermediate time range, or the last time range. In a further embodiment of the process 800, the first time range is representative of an initial assessment of the plurality of actors in conjunction with starting performance of the repeatable process. In this embodiment, each intermediate time range is representative of completion of a first or intermediate assessment period during performance of the repeatable process. In the embodiment being described, the last time range is representative of completion of a last assessment period during performance of the repeatable process.

In still yet another embodiment of the process 800, the repeatable process includes daily assessment periods, weekly assessment periods, monthly assessment periods, quarterly assessment periods, semester assessment periods, or trimester assessment periods.

In another embodiment of the process 800, the historical data includes a time parameter identifying a specific time range in relation to the duration. In this embodiment, the select time portion includes retrieved historical data with time parameters corresponding to the desired time range.

In yet another embodiment of the process 800, the historical data includes an actor parameter identifying a specific actor associated with performance of the repeatable process. In this embodiment, each select actor portion includes retrieved historical data with actor parameters corresponding to the actor parameters associated with the corresponding quantile range bin from the desired time range through at least a next time range of the repeatable process. In a further embodiment of the process 800, a minimum assessment level for the repeatable process is identified prior to forming the set of average assessment trajectories. In this embodiment, the process 800 also includes identifying the actor parameters for historical data in a last time range of the repeatable process that is less than the minimum acceptable level. Next, historical data associated with the identified actor parameters is eliminated from the select actor portion of the retrieved historical data for each quantile range unless doing so would eliminate all historical data from the select actor portion.

In still another embodiment of the process 800, the historical data includes an iteration parameter identifying a specific iteration of the repeatable process. In this embodiment, the process 800 also includes selecting one or more desired iterations of the repeatable process at the computational device, wherein the retrieved historical data is limited to historical data associated with the one or more desired iterations.

In still yet another embodiment of the process 800, the plurality of quantile range bins include four quartile range bins. In another embodiment of the process 800, the select ranges defining the plurality of quantile range bins overlap by a predetermined margin such that one or more assessment parameter values at the borders of adjacent range bins are members of both adjacent range bins. In yet another embodiment of the process 800, each average assessment trajectory includes at least one of a mean value over time, values ranging one standard deviation from the mean, values ranging two standard deviations from the mean, and values ranging three standard deviations from the mean.

Figure 9:
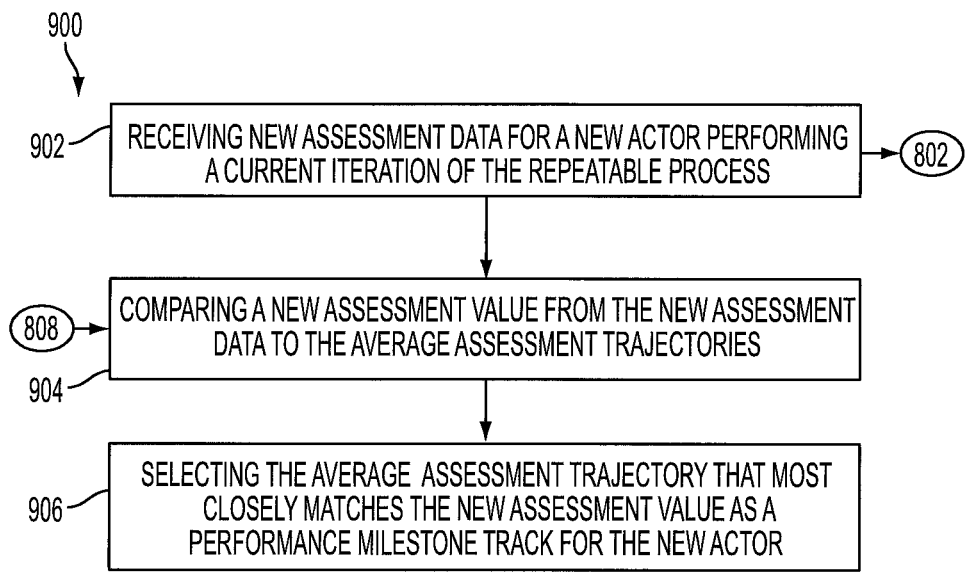
FIG. 9, in combination with FIG. 8, is a flowchart of another exemplary embodiment of a process for defining a performance milestone track for a planned process.

With reference to FIGS. 8 and 9, an exemplary embodiment of a process 900 for defining a performance milestone track for a planned process includes the process 800 of FIG. 8. The process 900 also includes receiving new assessment data for a new actor performing a current iteration of the repeatable process (902). The new assessment data is received at the computational device. The new assessment data is associated with the desired time range. Selection of the desired time range in 802 is based at least in part on receipt of the new assessment data. At 904, a new assessment value from the new assessment data is compared to the average assessment trajectories from 808. Next, the average assessment trajectory that most closely matches the new assessment value is selected as a performance milestone track for the new actor (906).

In another embodiment of the process 900, the performance milestone track includes at least one of a mean value over time, values ranging one standard deviation from the mean, values ranging two standard deviations from the mean, and values ranging three standard deviations from the mean.

Figure 10:
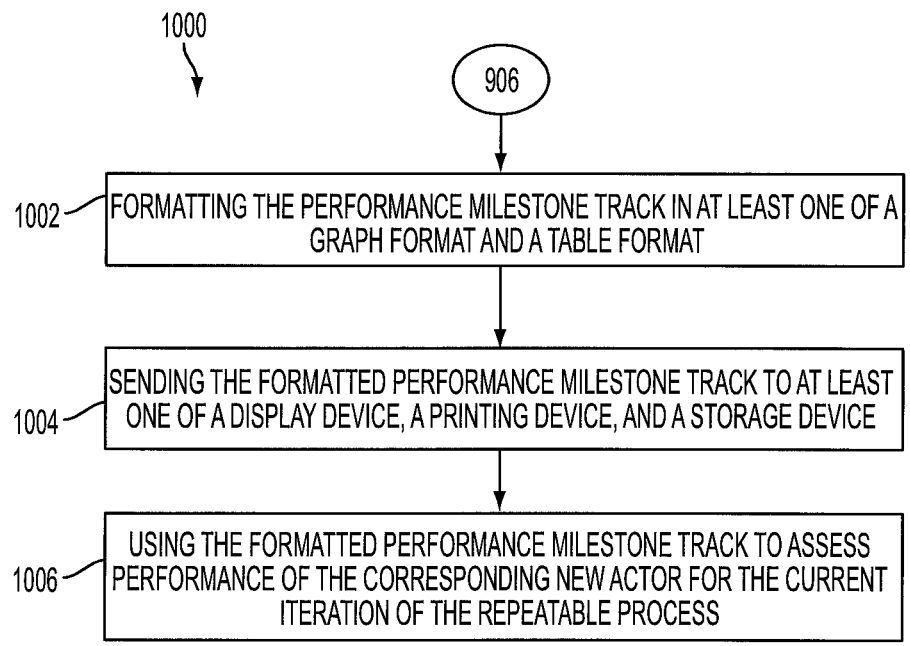
FIG. 10, in combination with FIGS. 8 and 9, is a flowchart of yet another exemplary embodiment of a process for defining a performance milestone track for a planned process.

With reference to FIGS. 8-10, an exemplary embodiment of a process 1000 for defining a performance milestone track for a planned process includes the processes 800, 900 of FIGS. 8 and 9. In this embodiment of the process 1000, the performance milestone track is representative of average assessment parameter values over time in relation to the duration of the repeatable process and new assessment data for the new actor in relation to the desired time range. The process 1000 continues from 906 to 1002 where the performance milestone track is formatted in at least one of a graph format and a table format. Next, the formatted performance milestone track is sent to at least one of a display device, a printing device, and a storage device (1004). At 1006, the formatted performance milestone track is used to assess performance of the corresponding new actor for the current iteration of the repeatable process.

Figure 11:
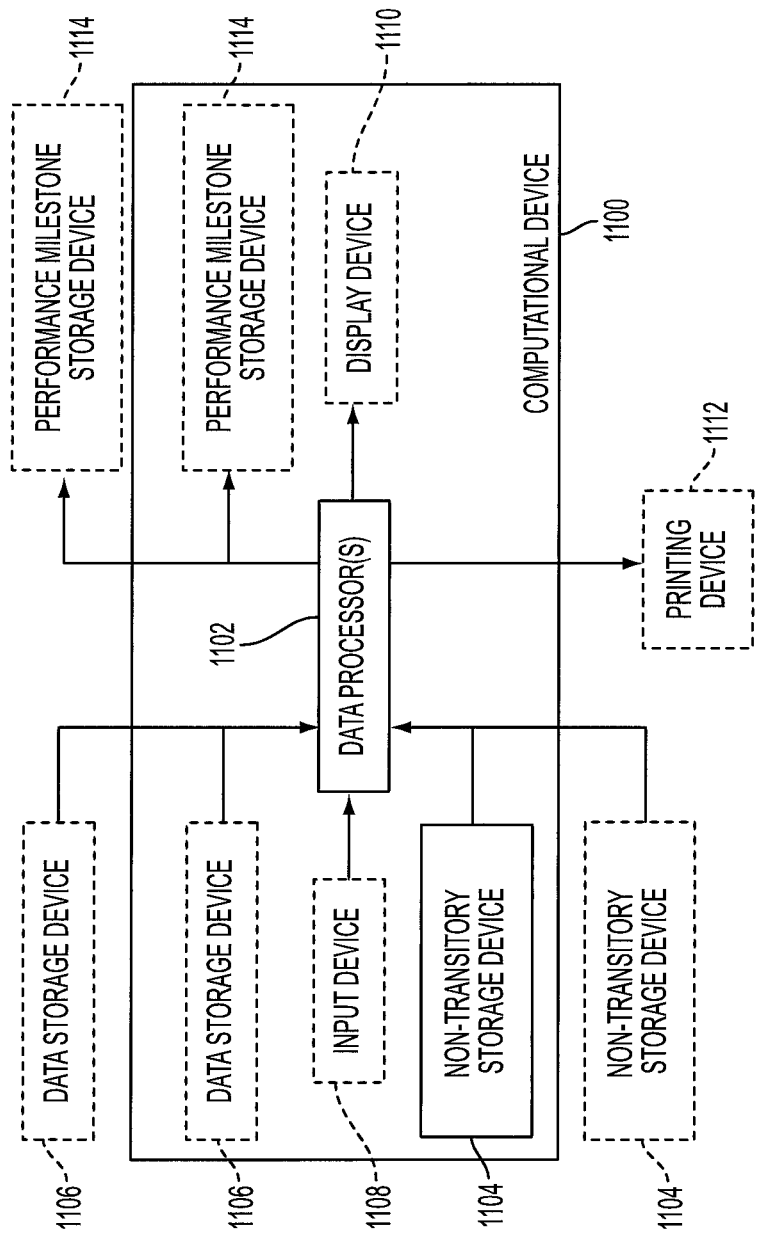
FIG. 11 is a block diagram of an exemplary embodiment of a computational device for defining a performance milestone track for a planned process.

With reference to FIG. 11, an exemplary embodiment of a computational device 1100 for defining a performance milestone track for a planned process includes at least one data processor 1102 and a non-transitory storage device 1104. The at least one data processor 1102 is configured to execute program instructions. The non-transitory storage device 1104 configured to store program instructions that, when executed by the at least one processor 1102, cause the computational device 1100 to perform a method of defining a performance milestone track for a planned process. The non-transitory storage device 1104 may be external to the computational device 1100 or a combination internal and external storage devices. The non-transitory storage device 1104 may be remote to the computational device 1100 or a combination of local and remote storage devices. In conjunction with execution of the program instructions, the at least one data processor 1102 is configured to select a desired time range in relation to a duration for a repeatable process to define a set of average assessment trajectories for the repeatable process. In conjunction with execution of the program instructions, the at least one data processor 1102 is configured to retrieve historical data from a data storage device 1106 accessible to the computational device 1100. The data storage device 1106 may be internal, external, or a combination thereof to the computational device 1100. The data storage device 1106 may be local, remote, or a combination thereof to the computational device 1100. The historical data is representative of assessment data for a plurality of actors in conjunction with selective assessments of the plurality of actors during performances of the repeatable process. The historical data includes an assessment parameter identifying a value for the corresponding selective assessment. In conjunction with execution of the program instructions, the at least one data processor 1102 is configured to process a select time portion of the retrieved historical data using a binning algorithm. The binning algorithm may include a quartile binning algorithm or any suitable binning algorithm. The binning algorithm assigns historical data for the select time portion across a plurality of quantile range bins based on select ranges of assessment parameter values for the corresponding historical data. In conjunction with execution of the program instructions, the at least one data processor 1102 is configured to separately process a select actor portion of the retrieved historical data for each quantile range bin using a smoothing algorithm to form the set of average assessment trajectories for the repeatable process. The smoothing algorithm may include a local regression (LOESS) algorithm, a locally weighted scatterplot smoothing (LOWESS) algorithm, or any suitable smoothing algorithm.

In another embodiment, the computational device 1100 also includes an input device 1108 configured to permit an operator of the computational device 1100 to interact with the at least one processor 1102 in conjunction with execution of the program instructions. In this embodiment, in conjunction with execution of the program instructions, the at least one data processor 1102 is configured to receive new assessment data for a new actor performing a current iteration of the repeatable process. In the embodiment being described, the new assessment data is received via the input device 1108. The new assessment data is associated with the desired time range. Selection of the desired time range is based at least in part on receipt of the new assessment data. In conjunction with execution of the program instructions, the at least one data processor 1102 is configured to compare a new assessment value from the new assessment data to the average assessment trajectories. In conjunction with execution of the program instructions, the at least one data processor 1102 is configured to select the average assessment trajectory that most closely matches the new assessment value as a performance milestone track for the new actor.

In a further embodiment of the computational device 1100, the performance milestone track is representative of average assessment parameter values over time in relation to the duration of the repeatable process and new assessment data for the new actor in relation to the desired time range. In this embodiment, the computational device 1100 also includes a display device 1110 configured to permit an operator of the computational device 1100 to interact with the at least one processor 1102 in conjunction with execution of the program instructions. In the embodiment being described, in conjunction with execution of the program instructions, the at least one data processor 1102 is configured to format the performance milestone track in at least one of a graph format and a table format. In conjunction with execution of the program instructions, the at least one data processor 1102 is configured to send the formatted performance milestone track to at least one of the display device 1110, a printing device 1112, and a performance milestone storage device 1114. The performance milestone storage device 1114 may be internal, external, or a combination thereof to the computational device 1100. The performance milestone storage device 1114 may be local, remote, or a combination thereof to the computational device 1100. The formatted performance milestone track is configured to enable a user of the computational device 1100 to assess performance of the corresponding new actor for the current iteration of the repeatable process.

In yet another embodiment of the computational device 1100, the set of average assessment trajectories are representative of average assessment parameter values over time in relation to the duration of the repeatable process. In this embodiment, the computational device 1100 also includes a display device 1110 configured to permit an operator of the computational device 1100 to interact with the at least one processor in conjunction with execution of the program instructions. In the embodiment being described, in conjunction with execution of the program instructions, the at least one data processor 1102 is configured to format the set of average assessment trajectories in at least one of a graph format and a table format. In conjunction with execution of the program instructions, the at least one data processor 1102 is configured to send the formatted set of average assessment trajectories to at least one of the display device 1110, a printing device 1112, and a performance milestone storage device 1114.

In still another embodiment, the computational device 1100 also includes an input device 1108 configured to permit an operator of the computational device 1100 to interact with the at least one processor 1102 in conjunction with execution of the program instructions. In this embodiment, the desired time range is received by the at least one processor 1102 from the input device 1108 in conjunction with operator interaction to select the desired time range.

In still yet another embodiment of the computational device 1100, the historical data includes a time parameter identifying a specific time range in relation to the duration. In this embodiment, the select time portion includes retrieved historical data with time parameters corresponding to the desired time range.

In another embodiment of the computational device 1100, the historical data includes an actor parameter identifying a specific actor associated with performance of the repeatable process. In this embodiment, each select actor portion includes retrieved historical data with actor parameters corresponding to the actor parameters associated with the corresponding quantile range bin from the desired time range through at least a next time range of the repeatable process. In a further embodiment of the computational device 1100, a minimum assessment level for the repeatable process is identified prior to forming the set of average assessment trajectories. In this embodiment, in conjunction with execution of the program instructions, the at least one data processor 1102 is configured to identify the actor parameters for historical data in a last time range of the repeatable process that is less than the minimum acceptable level. In the embodiment being described, in conjunction with execution of the program instructions, the at least one data processor 1102 is configured to eliminate historical data associated with the identified actor parameters from the select actor portion of the retrieved historical data for each quantile range unless doing so would eliminate all historical data from the select actor portion.

In yet another embodiment of the computational device 1100, the historical data includes an iteration parameter identifying a specific iteration of the repeatable process. In this embodiment, in conjunction with execution of the program instructions, the at least one data processor 1102 is configured to select one or more desired iterations of the repeatable process. The retrieved historical data is limited to historical data associated with the one or more desired iterations. In a further embodiment, the computational device 1100 includes an input device 1108 configured to permit an operator of the computational device to interact with the at least one processor 1102 in conjunction with execution of the program instructions. In this embodiment, the one or more desired iterations are received by the at least one processor 1102 from the input device 1108 in conjunction with operator interaction to select the one or more desired iterations. In still another embodiment of the computational device 1100, the plurality of quantile range bins include four quartile range bins. In still yet another embodiment of the computational device 1100, the select ranges defining the plurality of quantile range bins overlap by a predetermined margin such that one or more assessment parameter values at the borders of adjacent range bins are members of both adjacent range bins.

With reference to FIGS. 8-10, various exemplary embodiments of non-transitory computer-readable medium storing program instructions that, when executed by at least one processor, cause a corresponding computational device to perform a method of defining a performance milestone track for a planned process. For example, various embodiments of the computational device 1100 are described above with reference to FIG. 11. Various embodiments of the method of defining a performance milestone track for a planned process 800, 900, 1000, for example, are described above with reference to FIGS. 8-10.

In addition to the disclosure above, various exemplary embodiments of non-transitory computer-readable medium are disclosed herein. The various embodiments of non-transitory computer-readable medium store program instructions that, when executed by at least one processor, may cause a corresponding computational device to perform various combinations of functions associated with the various embodiments of the processes 800, 900, 1000 for defining a performance milestone track for a planned process described above with reference to FIGS. 8-10. For example, the various embodiments of the computational device 1100 described above with reference to FIG. 11 may include the at least one processor 1102 and may perform the various combination of functions associated with defining a performance milestone track for a planned process based on the program instructions stored on corresponding embodiments of the non-transitory computer readable medium.

In other words, the program instructions of the various exemplary embodiments of non-transitory computer-readable medium are defined by any suitable combination of the processes 800, 900, 1000 described above with reference to FIGS. 8-10. Similarly, the at least one processor 1102 and the computational device 1100 associated with the various exemplary embodiments of non-transitory computer-readable medium are defined by any suitable combination of the computational device 1100 described above with reference to FIG. 11.

It will be appreciated that variants of the above-disclosed and other features and functions, or alternatives thereof, may be combined into many other different computer platforms, computer applications, or combinations thereof. Various presently unforeseen or unanticipated alternatives, modifications, variations, or improvements therein may be subsequently made by those skilled in the art which are also intended to be encompassed by the following claims.

What is claimed is:

1. A method of defining a performance milestone track for a planned process, comprising:
   selecting a desired time range in relation to a duration for a repeatable process in conjunction with using a computational device to define a set of average assessment trajectories for the repeatable process;
   retrieving historical data from a data storage device accessible to the computational device, wherein the historical data is representative of assessment data for a plurality of actors in conjunction with selective assessments of the plurality of actors during performances of the repeatable process, wherein the historical data includes an assessment parameter identifying a value for the corresponding selective assessment;
   processing a select time portion of the retrieved historical data at the computational device using a binning algorithm, wherein the binning algorithm assigns historical data for the select time portion across a plurality of quantile range bins based on select ranges of assessment parameter values for the corresponding historical data; and separately processing a select actor portion of the retrieved historical data for each quantile range bin at the computational device using a smoothing algorithm to form the set of average assessment trajectories for the repeatable process.

2. The method of claim 1, further comprising:
receiving new assessment data for a new actor performing a current iteration of the repeatable process, wherein the new assessment data is received at the computational device, wherein the new assessment data is received at the computational device, wherein the new assessment data is associated with the desired time range, wherein selection of the desired time range is based at least in part on receipt of the new assessment data;
comparing a new assessment value from the new assessment data to the average assessment trajectories; and
selecting an average assessment trajectory that most closely matches the new assessment value as a performance milestone track for the new actor.

3. The method of claim 2 wherein the performance milestone track is representative of average assessment parameter values over time in relation to the duration of the repeatable process and new assessment data for the new actor in relation to the desired time range, the method further comprising:
formatting the performance milestone track in at least one of a graph format and a table format;
sending the formatted performance milestone track to at least one of a display device, a printing device, and a performance milestone storage device; and
using the formatted performance milestone track to assess performance of the corresponding new actor for the current iteration of the repeatable process.

4. The method of claim 1 wherein the set of average assessment trajectories are representative of average assessment parameter values over time in relation to the duration of the repeatable process, the method further comprising:
formatting the set of average assessment trajectories in at least one of a graph format and a table format; and
sending the formatted set of average assessment trajectories to at least one of a display device, a printing device, and a performance milestone storage device.

5. The method of claim 1 wherein the repeatable process is a specific grade level at a specific educational institution, wherein the plurality of actors are a plurality of students having completed the specific grade level at the specific education institution during one or more academic years, wherein the duration is defined by first and last days of an academic year.

6. The method of claim 1 wherein the duration is defined by a first time range, at least one intermediate time range, and a last time range;
wherein the desired time range is representative of the first time range, one of the at least one intermediate time range, or the last time range;
wherein the first time range is representative of an initial assessment of the plurality of actors in conjunction with starting performance of the repeatable process;
wherein each intermediate time range is representative of completion of a first or intermediate assessment period during performance of the repeatable process;
wherein the last time range is representative of completion of a last assessment period during performance of the repeatable process.

7. The method of claim 1 wherein the repeatable process includes daily assessment periods, weekly assessment periods, monthly assessment periods, quarterly assessment periods, semester assessment periods, or trimester assessment periods.

8. The method of claim 1 wherein the historical data includes a time parameter identifying a specific time range in relation to the duration;
wherein the select time portion includes retrieved historical data with time parameters corresponding to the desired time range.

9. The method of claim 1 wherein the historical data includes an actor parameter identifying a specific actor associated with performance of the repeatable process;
wherein each select actor portion includes retrieved historical data with actor parameters corresponding to the assessment parameters associated with the corresponding quantile range bin from the desired time range through at least a next time range of the repeatable process;
wherein a minimum assessment level for the repeatable process is identified prior to forming the set of average assessment trajectories, the method further comprising:
identifying the actor parameters for historical data in a last time range of the repeatable process that is less than the minimum acceptable level; and
eliminating historical data associated with the identified actor parameters from the select actor portion of the retrieved historical data for each quantile range unless doing so would eliminate all historical data from the select actor portion.

10. The method of claim 1 wherein the historical data includes an iteration parameter identifying a specific iteration of the repeatable process, the method further comprising:
selecting one or more desired iterations of the repeatable process at the computational device, wherein the retrieved historical data is limited to historical data associated with the one or more desired iterations.

11. The method of claim 1 wherein the plurality of quantile range bins include four quartile range bins.

12. The method of claim 1 wherein the select ranges defining the plurality of quantile range bins overlap by a predetermined margin such that one or more assessment parameter values at the borders of adjacent range bins are members of both adjacent range bins.

13. The method of claim 1 wherein each average assessment trajectory includes at least one of a mean value over time, values ranging one standard deviation from the mean, values ranging two standard deviations from the mean, and values ranging three standard deviations from the mean.

14. A computational device for defining a performance milestone track for a planned process, comprising:
at least one data processor configured to execute program instructions; and
a non-transitory storage device configured to store program instructions that, when executed by the at least one processor, cause the computational device to perform a method of defining a performance milestone track for a planned process;
wherein, in conjunction with execution of the program instructions, the at least one data processor is configured to select a desired time range in relation to a duration for a repeatable process to define a set of average assessment trajectories for the repeatable process;

wherein, in conjunction with execution of the program instructions, the at least one data processor is configured to retrieve historical data from a data storage device accessible to the computational device, wherein the historical data is representative of assessment data for a plurality of actors in conjunction with selective assessments of the plurality of actors during performances of the repeatable process, wherein the historical data includes an assessment parameter identifying a value for the corresponding selective assessment;

wherein, in conjunction with execution of the program instructions, the at least one data processor is configured to process a select time portion of the retrieved historical data using a binning algorithm, wherein the binning algorithm assigns historical data for the select time portion across a plurality of quantile range bins based on select ranges of assessment parameter values for the corresponding historical data;

wherein, in conjunction with execution of the program instructions, the at least one data processor is configured to separately process a select actor portion of the retrieved historical data for each quantile range bin using a smoothing algorithm to form the set of average assessment trajectories for the repeatable process.

15. The computational device of claim 14, further comprising:

an input device configured to permit an operator of the computational device to interact with the at least one processor in conjunction with execution of the program instructions;

wherein, in conjunction with execution of the program instructions, the at least one data processor is configured to receive new assessment data for a new actor performing a current iteration of the repeatable process, wherein the new assessment data is received via the input device, wherein the new assessment data is associated with the desired time range, wherein selection of the desired time range is based at least in part on receipt of the new assessment data;

wherein, in conjunction with execution of the program instructions, the at least one data processor is configured to compare a new assessment value from the new assessment data to the average assessment trajectories;

wherein, in conjunction with execution of the program instructions, the at least one data processor is configured to select an average assessment trajectory that most closely matches the new assessment value as a performance milestone track for the new actor.

16. The computational device of claim 15 wherein the performance milestone track is representative of average assessment parameter values over time in relation to the duration of the repeatable process and new assessment data for the new actor in relation to the desired time range, the computational device further comprising:

a display device configured to permit an operator of the computational device to interact with the at least one processor in conjunction with execution of the program instructions;

wherein, in conjunction with execution of the program instructions, the at least one data processor is configured to format the performance milestone track in at least one of a graph format and a table format;

wherein, in conjunction with execution of the program instructions, the at least one data processor is configured to send the formatted performance milestone track to at least one of the display device, a printing device, and a performance milestone storage device;

wherein the formatted performance milestone track is configured to enable a user of the computational device to assess performance of the corresponding new actor for the current iteration of the repeatable process.

17. The computational device of claim 14 wherein the set of average assessment trajectories are representative of average assessment parameter values over time in relation to the duration of the repeatable process, the computational device further comprising:

a display device configured to permit an operator of the computational device to interact with the at least one processor in conjunction with execution of the program instructions;

wherein, in conjunction with execution of the program instructions, the at least one data processor is configured to format the set of average assessment trajectories in at least one of a graph format and a table format;

wherein, in conjunction with execution of the program instructions, the at least one data processor is configured to send the formatted set of average assessment trajectories to at least one of the display device, a printing device, and a performance milestone storage device.

18. The computational device of claim 14, further comprising:

an input device configured to permit an operator of the computational device to interact with the at least one processor in conjunction with execution of the program instructions, wherein the desired time range is received by the at least one processor from the input device in conjunction with operator interaction to select the desired time range.

19. The computational device of claim 14 wherein the historical data includes an iteration parameter identifying a specific iteration of the repeatable process;

wherein, in conjunction with execution of the program instructions, the at least one data processor is configured to select one or more desired iterations of the repeatable process, wherein the retrieved historical data is limited to historical data associated with the one or more desired iterations;

the computational device further comprising:

an input device configured to permit an operator of the computational device to interact with the at least one processor in conjunction with execution of the program instructions, wherein the one or more desired iterations are received by the at least one processor from the input device in conjunction with operator interaction to select the one or more desired iterations.

20. A non-transitory computer-readable medium storing program instructions that, when executed by at least one processor, cause a corresponding computational device to perform a method of defining a performance milestone track for a planned process, the method comprising:

selecting a desired time range in relation to a duration for a repeatable process in conjunction with using a computational device to define a set of average assessment trajectories for the repeatable process;

retrieving historical data from a data storage device accessible to the computational device, wherein the historical data is representative of assessment data for a plurality of actors in conjunction with selective assessments of the plurality of actors during performances of the repeatable process, wherein the historical data includes an assessment parameter identifying a value for the corresponding selective assessment;

processing a select time portion of the retrieved historical data at the computational device using a binning algorithm, wherein the binning algorithm assigns historical data for the select time portion across a plurality of quantile range bins based on select ranges of assessment parameter values for the corresponding historical data; and separately processing a select actor portion of the retrieved historical data for each quantile range bin at the computational device using a smoothing algorithm to form the set of average assessment trajectories for the repeatable process.

\* \* \* \* \*